UNITED STATES PATENT OFFICE.

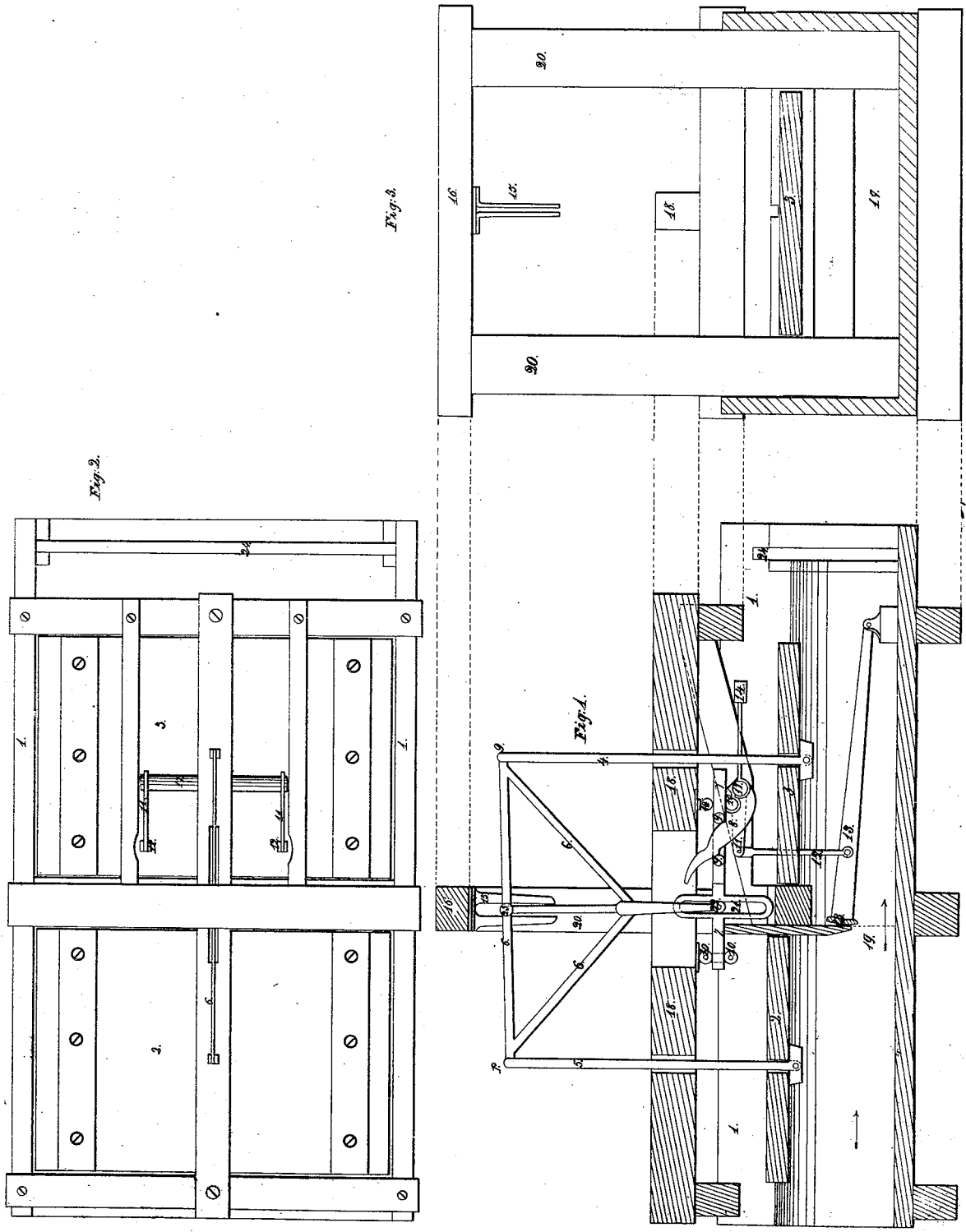

CLEMENT DARE, OF CINCINNATI, OHIO.

METHOD OF REGULATING FEED-GATES FOR MILLS, &c.

Specification of Letters Patent No. 14,227, dated February 12, 1856.

*To all whom it may concern:*

Be it known that I, CLEMENT DARE, of the city of Cincinnati, in the county of Hamilton and State of Ohio, have invented a new and useful improvement in self-regulating gates for supplying mills, canals, and other hydraulic works with a given constant quantity of water through apertures under variable heads of water.
The said improvement consists in combining floats with an arrangement of machinery hereinafter described, for the purpose of causing gates to close and open as the head of water increases or diminishes, so as to keep the aperture or opening of the proper capacity to pass at all times the same quantity of water under all the variations of the head of water, or difference of level of the water above and below the aperture, and I do hereby declare that the following is a full and exact description thereof, reference being had to the accompanying drawings forming part of this specification and to the letters and figures of reference marked thereon, similar letters and figures referring to like parts.

To enable others skilled in the art to make and use my improvement, I will proceed to describe its construction and operation by referring to the accompanying drawings.

Figure A, represents a longitudinal sectional elevation of the improved feed gate. Fig. B is a top view showing the floats and general construction of the channel box, and Fig. C is a transverse sectional elevation of the channel box, showing the gate opening and its general construction.

1, 1, represents the channel box; 2, the float on the surface of the water in the feeding portion of the channel box which I will call the feeding float, and 3 is the float in the other portion of the channel box, and which I shall term the flume float for designating the two floats from each other when their respective duties are being specified.

4 is a rod extending up from the flume float to the beam lever 6, and 5 is a similar rod attached to and extending up from the feeding float. The beam lever 6, consists of a frame, and in place of being attached to a common center, it is made to rise and fall to suit the required position of the two floats which are continually varying owing to the fluctuating height of the water both in the feeder and flume. The beam lever is provided with a friction roller 23, at its center, which works in four guide pieces 15, attached to the cross timber 16, supported by the upright timber 20 as shown in Fig. C.
An arm projects down from the center of the beam, and the end of it is provided with a friction roller 22 which works in the slot 21 cut in the bar 7. This bar is guided and made to move on friction rollers 10, 10, attached to the horizontal timber 18, 18, as represented in Fig. A.

13, properly speaking represents a section and side view of the feed-gate, and 19 is the opening for the water to pass from the feeder to the flume.

12 represents one of the two rods by which the feed gate is acted upon through the levers 11, 11, shaft 17 and lever cam 8, which cam is operated by the motion given to the horizontal bar 7 by the fall and rise of the floats acting on the beam lever 6.

9, 9, are friction rollers attached to the bar 7 for lessening its friction on the lever cam 8, and making its motion easy and regular.

14 is a weight attached to a rod that is fastened and extends from the shaft 17, and serves as a counter-balance to the gate 13 and its attachments, so that the power exerted by the floats can move the gate as easily up as down, thereby enabling each float to perform its duty accurately and at the proper points.

The operation of the improvement is as follows: Water is supposed to be in the feeder and flume as represented in Fig. A at its maximum height, and the gate 13 is open sufficiently to allow the required quantity of water to pass from the feeder through the gate opening 19 into the flume with the comparative levels of water in the feeder and flume as represented in Fig. A, and should the gate 24 (which is supposed to let the water on the wheel) be raised sufficiently high to lower the level of the water in the flume compared with its present represented height, the float 3 will fall, and in its descent will bring down the *g* end of the beam lever 6, which operates as before mentioned on the bar 7 and cam lever 8—and closes the gate 13, through the medium of the arms 11 and rods 12, and thereby regulates the flow of water through the gate opening 19 to suit the quantity required.

It makes no difference what the height of the head may be in the feeder, the descent and ascent of the flume float will govern the gate 13 so that the opening 19 will always have the required capacity to discharge a given quantity of water from the feeder with variable heads.

Should the water fall in the feeder, the feeding float 2 will correspondingly fall and bring down the $h$ end of the beam lever which operates the bar 7 and cam lever 8 by throwing the end of the cam lever up and raising the gate 13 through the medium of the arms 11 and rods 12, and thereby gives the full capacity to the opening 19 for the water to pass from the feeder to the flume in order to supply the quantity required.

Thus it will be seen that the least comparative difference of the levels of water in the feeder and flume, will operate on the gate 13 to close or open it as the case may be to allow the proper quantity of water to pass through the opening 19, and should the water in the feeder and flume fall or rise simultaneously, the floats together with the rods 4 and 5, and beam lever 6 would likewise fall and rise without having any action on the gate 13, the beam lever 6 being made as before stated to slide up and down in the guide pieces 15 attached to the cross timber 16 and slot 21 in the bar 7 as represented in Fig. A. The cam lever 8, in this case, is curved in such a manner as to give the proper opening to the gate for discharging the proper quantity of water under variable heads; a simple proportional movement would not effect this object, that is, if the gate should rise or fall one inch for every three inches of the movement of the floats, the opening 19, compared with the height of the head at its highest point, would have a greater capacity for the discharge of water than is required, and when the water in the feeder was at its lowest level, the gate would be too much closed to allow a proper supply of water. To obviate this difficulty the cam lever 8 is curved so that when the bar 7 acts upon it, its motion will be such as to open the gate 13 and allow a given quantity of water to flow from the feeder into the flume under variable heads, or at comparatively different levels of water in the feeder and flume.

In the form of self-regulating gates just described, I use two floats, but when the water on one side of the feeding gate is to be kept at a given level, while the head from which it is fed continually fluctuates, as is the case in streams that supply canals and other hydraulic works, the feeding can be effected by one float by placing it in the feeder and providing it with an upright shaft which will rise and fall with the float, and by providing the said shaft with a given curve, and some mechanical means in a line with said curve to operate on a horizontal bar which will have a connection with the feeding gate, and thereby open and close the gate sufficiently to allow a given quantity of water to pass through, under variable heads, from the feeder into the canal or other channel and keep the same at the proper level.

My improvement can be applied to such purposes as have been described with great advantage, as it results in saving the labor and expense of a person to attend the feed gate, which is always required, to secure a regular supply of water into canals and hydraulics owing to the fluctuating character of the streams that supply them.

The lever cam before mentioned in the self regulating feed gate where two floats are used, is equivalent to the curve applied to the shaft when but one float is used to regulate the quantity of water discharged into canals and similar hydraulic works. As specified in the foregoing specifications, the curves on the lever cam worked in connection with the two floats, and the curve on the upright shaft both serve the same office, namely, regulating the capacity of the aperture through which the water is discharged, so that a given quantity may be discharged under variable heads of water.

What I claim as my improvement and desire to secure by Letter Patent is—

The combination of the floats 2 and 3, rods 4 and 5, beam lever 6 and silding bar 7, 7, and these in combination with the cam lever 8, shaft 17, levers 11, 11, and rods 12, 12, or their equivalents for operating the gate 13, in the manner and for the purposes substantially set forth in the foregoing specifications.

CLEMENT DARE. [L. S.]

Witnesses:
MARTIN BENSON,
L. W. SMITH.